United States Patent
Oryoji et al.

(10) Patent No.: US 10,469,794 B2
(45) Date of Patent: Nov. 5, 2019

(54) INFORMATION PROCESSING APPARATUS, INFORMATION PROCESSING METHOD, AND INFORMATION PROCESSING SYSTEM FOR CONTENT MANAGEMENT USING PLAY LISTS

(71) Applicant: SONY CORPORATION, Tokyo (JP)

(72) Inventors: Hiroshi Oryoji, Kanagawa (JP);
Masashi Eshima, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/437,170

(22) PCT Filed: Oct. 16, 2013

(86) PCT No.: PCT/JP2013/078038
§ 371 (c)(1),
(2) Date: Apr. 20, 2015

(87) PCT Pub. No.: WO2014/065165
PCT Pub. Date: May 1, 2014

(65) Prior Publication Data
US 2015/0271440 A1 Sep. 24, 2015

(30) Foreign Application Priority Data
Oct. 26, 2012 (JP) .................................. 2012-236312

(51) Int. Cl.
*H04N 5/93* (2006.01)
*G11B 20/10* (2006.01)
(Continued)

(52) U.S. Cl.
CPC ......... *H04N 5/93* (2013.01); *G11B 20/10527* (2013.01); *G11B 27/105* (2013.01);
(Continued)

(58) Field of Classification Search
CPC . G11B 20/10527; G11B 27/105; G11B 27/28; H04N 21/4335; H04N 21/26258;
(Continued)

(56) References Cited

U.S. PATENT DOCUMENTS 6,941,324 B2 * 9/2005 Plastina ............ G06F 17/30749
7,580,610 B2 * 8/2009 Yao .................. H04N 21/23106
386/248

(Continued)

FOREIGN PATENT DOCUMENTS

JP    HEI-04-307881 A    10/1992
JP    10-224665 A        8/1998

(Continued)

OTHER PUBLICATIONS

Office Action for JP Patent Application No. 2014-543245, dated Sep. 5, 2017, 03 pages of Office Action and 02 pages of English Translation.

*Primary Examiner* — David E Harvey
(74) *Attorney, Agent, or Firm* — Chip Law Group

(57) ABSTRACT

The present technique relates to an information processing apparatus, an information processing method, a program, and an information processing system capable of efficiently and temporarily storing contents in a case where the contents are played back using a play list. A calculation unit calculates, on the basis of a play list indicating contents adopted as a playback target chosen from among a plurality of contents, a priority level about a cash temporarily storing the contents, for each of the contents. For example, the present technique can be applied to an information processing system and the like performing streaming playback of contents based on MPEG (Moving Picture Experts Group phase)-DASH standard.

10 Claims, 8 Drawing Sheets

(51) Int. Cl.

| | |
|---|---|
| *H04N 9/82* | (2006.01) |
| *H04N 21/845* | (2011.01) |
| *G11B 27/10* | (2006.01) |
| *G11B 27/28* | (2006.01) |
| *H04N 21/262* | (2011.01) |
| *H04N 21/433* | (2011.01) |
| *H04N 21/4335* | (2011.01) |
| *H04N 21/25* | (2011.01) |
| *H04N 21/258* | (2011.01) |
| *H04N 21/482* | (2011.01) |
| *H04N 5/76* | (2006.01) |
| *H04N 5/765* | (2006.01) |

(52) U.S. Cl.
CPC ........... *G11B 27/28* (2013.01); *H04N 9/8205* (2013.01); *H04N 21/252* (2013.01); *H04N 21/25891* (2013.01); *H04N 21/26258* (2013.01); *H04N 21/4331* (2013.01); *H04N 21/4335* (2013.01); *H04N 21/4825* (2013.01); *H04N 21/8456* (2013.01); *G11B 2020/10675* (2013.01); *H04N 5/76* (2013.01); *H04N 5/765* (2013.01)

(58) Field of Classification Search
CPC .... H04N 21/4331; H04N 5/93; H04N 9/8205; H04N 21/8456; H04N 21/251; H04N 21/25891; H04N 21/4825
USPC ........................................................ 386/262
See application file for complete search history.

(56) References Cited

U.S. PATENT DOCUMENTS

| | | | | |
|---|---|---|---|---|
| 7,840,570 B2* | 11/2010 | Martin Cervera | ........................... G06F 17/30035 | 707/748 |
| 8,396,800 B1* | 3/2013 | Wieder | ................ H04L 67/306 | 705/50 |
| 2002/0057893 A1* | 5/2002 | Wood | ................... H04N 5/4401 | 386/355 |
| 2002/0059440 A1* | 5/2002 | Hudson | ............ G06F 17/30902 | 709/231 |
| 2004/0228607 A1* | 11/2004 | Tsutsumitake | ....... G11B 27/031 | 386/231 |
| 2005/0251565 A1* | 11/2005 | Weel | ................. G06F 17/30053 | 709/219 |
| 2006/0239131 A1* | 10/2006 | Nathan | ................ G11B 19/025 | 369/30.06 |
| 2007/0053246 A1* | 3/2007 | Sano | ...................... G11B 27/34 | 369/30.04 |
| 2008/0058037 A1* | 3/2008 | Dunn | ................... H04R 1/1041 | 455/575.2 |
| 2008/0139189 A1* | 6/2008 | Hyatt | .................. H04L 67/2852 | 455/418 |
| 2008/0189390 A1* | 8/2008 | Heller | .................... G11B 27/10 | 709/218 |
| 2008/0301173 A1* | 12/2008 | Ryu | .................. G06F 17/30056 | |
| 2008/0319856 A1* | 12/2008 | Zito | .................. G06F 17/30873 | 705/14.73 |
| 2009/0037382 A1* | 2/2009 | Ansari | ............. G06F 17/30749 | |
| 2009/0055467 A1* | 2/2009 | Petersen | ............. H04L 67/1095 | 709/203 |
| 2009/0132453 A1* | 5/2009 | Hangartner | ....... G06F 17/30053 | 706/46 |
| 2009/0164607 A1* | 6/2009 | Clark | ................ G06F 17/30867 | 709/219 |
| 2009/0193338 A1* | 7/2009 | Fiatal | .................... H04L 12/587 | 715/716 |
| 2009/0327222 A1* | 12/2009 | Spitzer-Williams | ........................ G06F 17/30029 | |
| 2010/0031366 A1* | 2/2010 | Knight | ................... G06Q 10/10 | 726/26 |
| 2012/0030436 A1* | 2/2012 | Panje | ....................... H04N 1/21 | 711/156 |
| 2012/0124162 A1* | 5/2012 | Cassidy | ............ G06F 17/30029 | 709/217 |
| 2012/0131125 A1* | 5/2012 | Seidel | ...................... H04N 5/76 | 709/212 |
| 2012/0158531 A1* | 6/2012 | Dion | ...................... G06Q 10/10 | 705/26.1 |
| 2012/0203932 A1* | 8/2012 | da Costa | ................ H04L 67/10 | 709/248 |
| 2012/0215684 A1* | 8/2012 | Kidron | ............. G06F 17/30867 | 705/39 |
| 2013/0024431 A1* | 1/2013 | Parthasarathy | ... G06F 17/30663 | 707/692 |
| 2013/0050098 A1* | 2/2013 | Ide | ....................... G06F 3/04886 | 345/173 |
| 2013/0124584 A1* | 5/2013 | Otto | .................. G06F 17/30769 | 707/822 |
| 2013/0166625 A1* | 6/2013 | Swaminathan | .. H04N 21/64738 | 709/203 |
| 2014/0031961 A1* | 1/2014 | Wansley | ........... G06F 17/30766 | 700/94 |
| 2014/0122465 A1* | 5/2014 | Bilinski | ............. G06F 17/30761 | 707/723 |
| 2015/0271440 A1* | 9/2015 | Oryoji | ................ H04N 21/8456 | 386/248 |
| 2015/0334204 A1* | 11/2015 | Bilinski | ............. H04L 67/2857 | 715/748 |

FOREIGN PATENT DOCUMENTS

| | | |
|---|---|---|
| JP | HEI-10-224665 A | 8/1998 |
| JP | 3999004 B2 | 10/2007 |
| JP | 2008-042269 A | 2/2008 |
| JP | 2011-028792 A | 2/2011 |
| JP | 2011-128461 A | 6/2011 |

* cited by examiner

INFORMATION PROCESSING APPARATUS, INFORMATION PROCESSING METHOD, AND INFORMATION PROCESSING SYSTEM FOR CONTENT MANAGEMENT USING PLAY LISTS

TECHNICAL FIELD

The present technique relates to an information processing apparatus, an information processing method, a program, and an information processing system, and more particularly, to an information processing apparatus, an information processing method, a program, and an information processing system capable of efficiently and temporarily storing contents in a case where the contents are played back using a play list.

BACKGROUND ART

In a system to save contents to a server and allow the contents to be viewed with a client, there exists a method in which the client uses a cache that temporarily stores the contents as a method of increasing the speed of access to the content and reducing the load of a network. It should be noted that the contents may include a motion image, a still image, a sound (audio), and the like.

Methods for deleting contents in a cache include a method for deleting contents in such an order that older contents are deleted first (Least Recently Used), a method for deleting contents in such an order that newer contents are deleted first (Most Recently Used), and a method for deleting contents in such an order that contents less frequently used are deleted first (Least Frequently Used). There is also a method of preferentially deleting contents which belong to a genre of a low viewing tendency on the basis of a viewing history (for example, see Patent Document 1).

When contents are randomly accessed in the method for deleting contents in such an order that older or newer contents are deleted first, it is highly possible that contents to be accessed are already deleted, and the cache cannot efficiently store contents.

In contrast, in the method of deleting contents in the cache on the basis of the usage frequency and the viewing history, contents which are less likely to be used in the future based on the usage in the past are preferentially deleted, and therefore, the cache can efficiently store the contents.

CITATION LIST

Patent Document

Patent Document 1: Japanese Patent No. 3999004

SUMMARY OF THE INVENTION

Problems to be Solved by the Invention

However, no method has yet been invented to efficiently control a cache in a case where contents are played back using a play list indicating contents to be played back.

The present technique has been made in view of such circumstances, and the present technique is to be able to efficiently and temporarily store contents in a case where playback is done using a play list.

Solutions to Problems

An information processing apparatus according to a first aspect of the present technique includes: a calculation unit configured to calculate, on the basis of a play list indicating contents adopted as a playback target chosen from among a plurality of contents, a priority level about a storage unit temporarily storing the contents, for each of the contents.

An information processing method and a program according to the first aspect of the present technique correspond to the information processing apparatus according to the first aspect of the present technique.

In the first aspect of the present technique, on the basis of a play list indicating contents adopted as a playback target chosen from among a plurality of contents, a priority level about a storage unit temporarily storing the contents is calculated for each of the contents.

An information processing system according to a second aspect of the present technique includes: a first information processing apparatus; and a second information processing apparatus, and the information processing system further includes: a storage unit configured to temporarily store contents; a calculation unit configured to calculate, on the basis of a play list indicating contents adopted as a playback target chosen from among a plurality of the contents, a priority level about the storage unit, for each of the contents; and a control unit configured to delete the content stored in the storage unit, on the basis of the priority level calculated by the calculation unit.

In the second aspect of the present technique, the information processing system includes: a first information processing apparatus; and a second information processing apparatus, and contents are temporarily stored, a priority level about the storage unit is calculated for each of the contents on the basis of a play list indicating contents adopted as a playback target chosen from among a plurality of the contents, and the content stored in the storage unit is deleted on the basis of the priority level calculated by the calculation unit.

Effects of the Invention

According to the present technique, contents can be efficiently and temporarily stored in a case where playback is done using a play list.

MODE FOR CARRYING OUT THE INVENTION

First Embodiment

<Example of Configuration of First Embodiment of Information Processing System>

Figure 1:
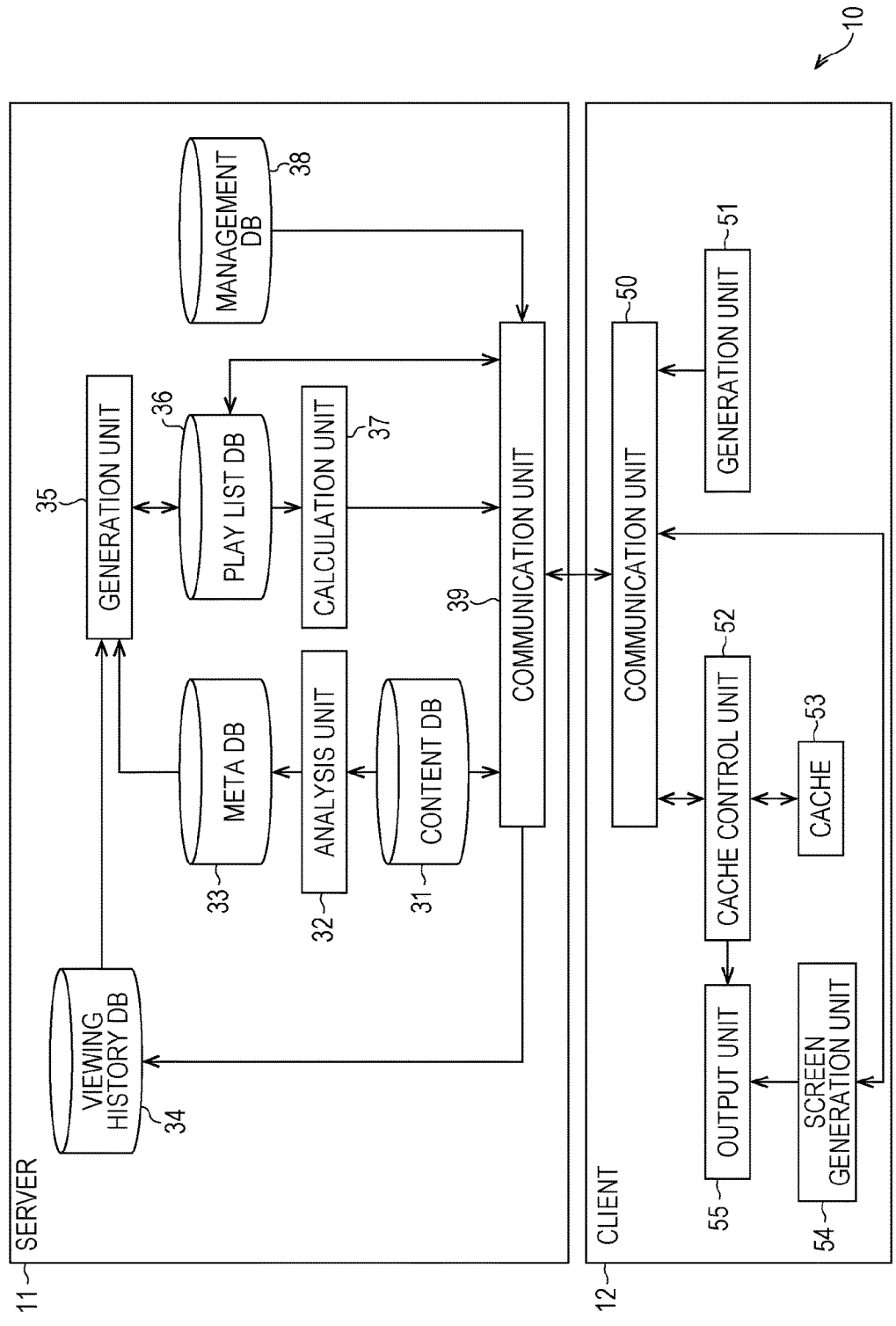
FIG. 1 is a block diagram illustrating an example of a configuration of a first embodiment of an information processing system to which the present technique is applied.

FIG. 1 is a block diagram illustrating an example of a configuration of the first embodiment of an information processing system to which the present technique is applied.

An information processing system 10 of FIG. 1 includes a server 11 serving as an information processing apparatus and a client 12 serving as an information processing apparatus. The information processing system 10 performs streaming playback of contents based on MPEG (Moving Picture Experts Group phase)-DASH standard on the basis of a play list.

More specifically, the server 11 includes a content DB 31, an analysis unit 32, a meta DB 33, a viewing history DB 34, a generation unit 35, a play list DB 36, a calculation unit 37, a management DB 38, and a communication unit 39. The server 11 calculates the priority level in the cache 53 of the client 12 for each content in units of scenes on the basis of a play list of contents stored in the content DB.

More specifically, the content DB 31 of the server 11 stores contents. The analysis unit 32 reads content stored in the content DB 31, and divides the content into scenes.

For example, when content is a motion image, the analysis unit 32 matches a still image of a particular person to an image in each frame constituting the content, and divides the content into sections of images in units of frames including the still picture of the person, and adopts these sections as scenes in which the person appears. The analysis unit 32 divides the content into sections of images in units of frames affected by camera shake in the content, and adopts these sections as scenes failed to shoot.

When the content is sound, the analysis unit 32 analyzes the content and divides the content into sections including laughter as scenes including laughter, or divides sections including a chorus and an intro of a song as scenes having the chorus and the intro of the song, respectively.

For each scene divided, the analysis unit 32 generates meta data indicating content of the scene. Examples of the meta data include data indicating that a particular person is appearing, data indicating there is laughter, data indicating failure in shooting, data indicating there is laughter, and data indicating there is chorus or intro of a song. The analysis unit 32 provides meta data of each scene to the meta DB 33, and stores the meta data of each scene to the meta DB 33.

The viewing history DB 34 stores a viewing history of each play list and each scene provided by the communication unit 39. It should be noted that examples of viewing history include the number of times of viewing, the date and time of viewing, and the like.

The generation unit 35 generates a play list in which scenes preferred by a user are a playback target, on the basis of a viewing history of at least one of each scene or each play list from the viewing history DB 34, the meta data stored in the meta DB 33, and the like.

More specifically, for example, the generation unit 35 determines meta data of scenes preferred by a user on the basis of the viewing history of each scene and the meta data of the scene. Alternatively, for example, the generation unit 35 reads the play list from the play list DB 36, and recognizes a scene of the playback target using the play list. Then, the generation unit 35 determines meta data of the scene preferred by the user on the basis of the viewing history of each play list, a scene of the playback target in the play list, and the meta data of the scene.

The generation unit 35 generates a play list in which the scenes corresponding to the determined meta data are the playback target, and provides the play list to the play list DB 36.

The play list DB 36 stores the play list provided by the generation unit 35 and the play list provided by the communication unit 39.

The calculation unit 37 stores the priority levels of the contents in units of the scenes. The initial value of the priority level is zero. The calculation unit 37 reads the play list from the play list DB 36, and adds a predetermined value to the priority levels of the content in units of scenes which are the playback target in the read play list, thus updating the priority levels. The calculation unit 37 provides the updated priority levels to the communication unit 39.

The management DB 38 stores content information about contents, such as the number of contents stored in the content DB 31 and the names of the contents.

In reply to a request form the client 12, the communication unit 39 reads content of a predetermined scene from the content DB 31, and transmits the content to the client 12. The communication unit 39 transmits the priority level provided by the calculation unit 37 to the client 12. Further, the communication unit 39 provides the play list transmitted from the client 12 to the play list DB 36.

In response to a request from the client 12, the communication unit 39 reads the play list from the play list DB 36, and transmits the play list to the client 12. Further, in response to a request from the client 12, the communication unit 39 reads content information from the management DB 38, and transmits the content information to the client 12. Then, the communication unit 39 provides each scene and the viewing history of each play list transmitted from the client 12 to the viewing history DB 34.

The client 12 includes a communication unit 50, a generation unit 51, a cache control unit 52, a cache 53, a screen generation unit 54, and an output unit 55, and is configured to temporarily store some of the contents stored in the server 11 and display the content thereof.

More specifically, in response to a request from the cache control unit 52, the communication unit 50 of the client 12 requests the server 11 to transmit the content of a predetermined scene, and as a result, receives the content of the predetermined scene transmitted from the communication unit 39 of the server 11. The communication unit 50 provides the received content to the cache control unit 52. The communication unit also 50 receives a priority level transmitted from the communication unit 39, and provides the priority level to the cache control unit 52.

Further, in response to a request from the cache control unit 52, the communication unit 50 requests the server 11 to transmit a play list, and as a result, the communication unit 50 receives the play list transmitted from the communication unit 39. The communication unit 50 provides the received play list to the cache control unit 52. The communication unit 50 also transmits each scene and the viewing history of each play list provided by the cache control unit 52 to the server 11.

In response to a request from the screen generation unit 54, the communication unit 50 requests the server 11 to transmit content information, and as a result, the communication unit 50 receives the content information transmitted from the communication unit 39, and provides the content information to the screen generation unit 54. The communication unit 50 transmits the play list provided by the generation unit 51 to the server 11. Accordingly, the play list is stored to the play list DB 36.

The generation unit 51 generates a play list on the basis of an instruction given by a user. More specifically, for example, when content of a scene which is to be adopted as a playback target in the play list is being output to the output unit 55, the user gives a command for selecting the scene. The generation unit 51 generates a play list containing, as the playback target, the content of the scene of which selection is commanded by the user. The generation unit 51 provides the generated play list to the communication unit 50.

The cache control unit 52 includes a nonvolatile memory and the like, and stores the priority levels of the content in units of scenes provided by the communication unit 50. The cache control unit 52 requests the communication unit 50 to transmit the play list, and as a result, the cache control unit 52 stores the play list provided by the communication unit 50.

The cache control unit 52 causes the output unit 55 to display information about all the stored play lists on the output unit 55. The user selects a play list of contents which is to be adopted as the playback target from among all the play lists displayed on the output unit 55.

The cache control unit 52 requests the communication unit 50 to give content of a predetermined scene in the contents stored in the content DB 31, on the basis of the play list of the contents adopted as the playback target selected by the user, the stored priority levels, and the like. The cache control unit 52 provides the content provided by the communication unit 50 as a result to the cache 53 so that the content in the cache 53 is temporarily stored.

Further, the cache control unit 52 deletes the content in units of scenes stored in the cache 53 on the basis of the priority levels. In accordance with the play list of the contents which are adopted as the playback target, the cache control unit 52 reads the content in units of scenes stored in the cache 53, provides the content to the output unit 55, and displays the content on the output unit 55.

At this occasion, the cache control unit 52 increases, by one, the number of times of viewing of the scene corresponding to the content in units of scenes having been read out serving as a viewing history, and increases, by one, the number of times of viewing of the play list of the contents which is adopted as the playback target. The initial value of the number of times of viewing is zero. The cache control unit 52 provides the updated viewing history to the communication unit 50.

The screen generation unit 54 requests the communication unit 50 to transmit the content information in accordance with a user's command for displaying a list of content information. Accordingly, the screen generation unit 54 generates a list screen for displaying a list of content information on the basis of content information provided by the communication unit 50. The screen generation unit 54 provides the generated list screen to the output unit 55, and displays the generated list on the output unit 55.

The output unit 55 includes a display, a speaker, and the like. The output unit 55 displays a list screen provided by the screen generation unit 54, information about play lists provided by the cache control unit 52, and motion and still images as content in units of scenes. The output unit 55 outputs sound as content in units of scenes.

<Example of Play List>

Figure 2:
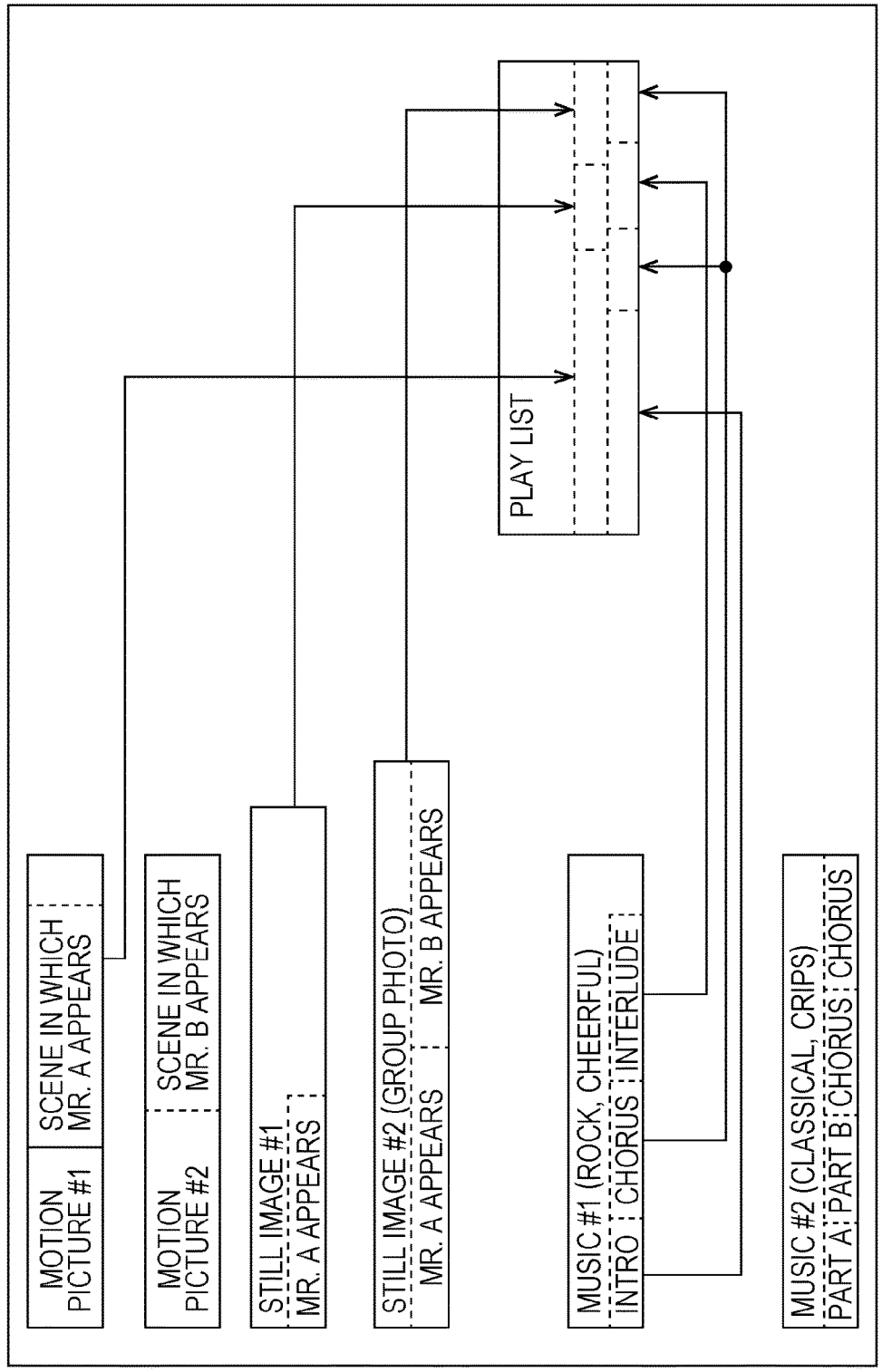
FIG. 2 is a diagram illustrating an example of a play list.

FIG. 2 is a diagram illustrating an example of a play list.

In the example of FIG. 2, the content DB 31 stores, as contents, a motion image #1 including a scene in which Mr. A appears, a motion image #2 including a scene in which Mr. B appears, a still image #1 in which Mr. A appears, a still image #2 in which Mr. A and Mr. B appear, cheerful rock music #1, and refreshing classical music #2.

In this case, the meta DB 33 stores meta data indicating that Mr. A appears as meta data of a scene of the motion image #1 in which Mr. A appears, and meta data indicating that Mr. B appears as meta data of a scene of the motion image #2. The meta DB 33 also stores meta data indicating that Mr. A appears as meta data of a scene of the still image #1; and stores meta data indicating that Mr. A appears and meta data indicating that Mr. B appears, as meta data of a scene of the still image #2.

The meta DB 33 also stores meta data indicating that there are intro, chorus, and interlude of rock music as meta data of a scene of sections including the intro, chorus, and interlude, respectively, of the song of the music #1. Further, the meta DB 33 stores meta data indicating there are a part A, a part B, a first chorus, and a second chorus of the classical music as the meta data of a scene of sections including the part A, the part B, the first chorus, and the second chorus, respectively, of the song of the music #2.

In this case, when the meta data of a scene preferred by a user are determined to be the meta data indicating that Mr. A appears and meta data indicating rock music, the generation unit 35 generates a play list including the motion image and the still image in which Mr. A appears as well as the rock music as the playback target.

More specifically, for example, the generation unit 35 generates, as shown in FIG. 2, a play list in which the scene of the motion image #1 in which Mr. A appears, the still image #1, and the still image #2 are adopted as the playback target in this order, and in which the intro, the chorus, the interlude, and the chorus of the music #1 are adopted as the playback target in this order. As a result, the play list of the content indicating "Mr. A" is generated.

It should be noted that the generation unit 35 may generate a play list for designating application of transition processing (transaction processing) between scenes, and superimposing telops and the like. The play list is not limited to the example of FIG. 2, and may be, for example, a play list of content indicating "travel" in which content of scenes in a period of travelling is adopted as the playback target.

<Example of Operation of Deleting Cache>

Figure 3:
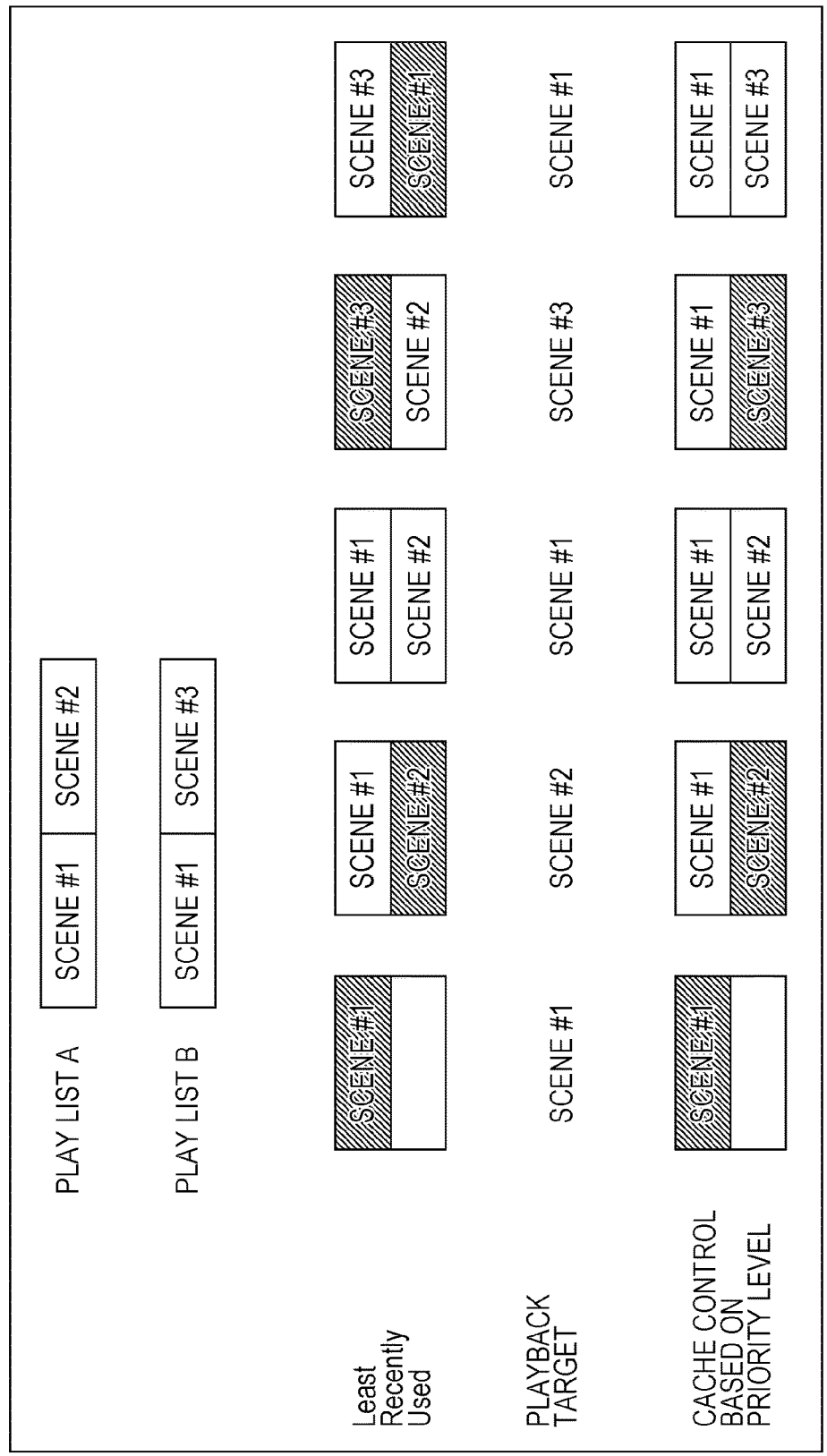
FIG. 3 is a diagram illustrating an example of operation of deleting a cache.

FIG. 3 is a figure illustrating an example of operation of deleting the cache 53 according to control performed by the cache control unit 52 of FIG. 1.

In an example of FIG. 3, described is a case where playback of content based on a play list A in which contents of a scene #1 and a scene #2 are adopted as the playback target in order and playback of content based on a play list B in which contents of a scene #1 and a scene #3 are adopted as the playback target in order are performed alternately.

In this case, the content of the scene #1 is included in both of the play list A and the play list B, and therefore, the priority level of the content of the scene #1 is twice a predetermined value (for example, one). On the other hand, the contents of the scene #2 and the scene #3 are included in only one of the play list A and the play list B, and therefore, the priority levels of the contents of the scene #2 and the scene #3 are the predetermined value.

Therefore, as shown in FIG. 3, in the control of the cache 53 performed by the cache control unit 52 on the basis of the priority level, first, when the content of the scene #1 is played back based on the play list A, the cache control unit 52 uses the communication unit 50 to request the server 11 to transmit the content of the scene #1, and stores the content of the scene #1 obtained as a result to the cache 53.

Subsequently, when the content of the scene #2 is played back based on the play list A, the cache control unit 52 uses the communication unit 50 to request the server 11 to transmit the content of the scene #2, and stores the content of the scene #2 obtained as a result to the cache 53.

Then, when the content of the scene #1 is played back based on the play list B, the cache 53 already stores the content of the scene #1, and therefore, the cache control unit 52 does not request the server 11 to transmit the content.

Subsequently, when the content of the scene #3 is played back based on the play list B, the cache control unit 52 uses the communication unit 50 to request the server 11 to transmit the content of the scene #3. Then, of the contents of scene #1 and the scene #2 stored in the cache 53, the cache control unit 52 deletes the content of the scene #2 with a lower priority level, and stores, into the cache 53, the content of the scene #3 transmitted from the server 11 in response to the request.

Then, when the content of the scene #1 is played back based on the play list B, the cache 53 already stores the content of the scene #1, and therefore, the cache control unit 52 does not request the server 11 to transmit the content.

As described above, the priority level of the content of the scene #1, which is adopted as the playback target in both of the play list A and the play list B, is configured to be higher than the priority levels of the contents of the scene #2 and the scene #3 which are adopted as the playback target in any one of the play list A and the play list B; and therefore, the content of the scene #1 is preferentially left in the cache 53. As a result, when the content of the scene #1 is played back, it is not necessary to request the server 11 to transmit the content of the scene #1 and store the content of the scene #1 to the cache 53. More specifically, the efficiency of the cache 53 is high.

In contrast, for example, in the method for deleting contents in such an order that older contents are deleted first (Least Recently Used), when contents of the scene #1, the scene #2, and the scene #1 are played back in this order, the contents are stored in the same manner as the cache 53 as shown in FIG. 3. However, when the content of the scene #3 is played back, the content of the scene #1, which is the older of the contents of the scene #1 and the scene #2 stored in the cache, is deleted; and the content of the scene #3 is stored. Therefore, when the content of the scene #1 is subsequently played back, the content of the scene #1 is not present in the cache, and it is necessary to store the content of the scene #1 again.

As described above, in the method for deleting contents in such an order that older contents are deleted first (Least Recently Used), even the content of the scene #1 that is likely to be used in the future is deleted if it is the oldest content in the cache. Therefore, the efficiency of the cache is low.

In the example of FIG. 3, for the sake of easier description, it is considered that nothing is stored in the cache 53 before the playback is started; however, in reality, contents of predetermined scenes are stored on the basis of the priority levels.

<Explanation about Processing of Information Processing System>

Figure 4:
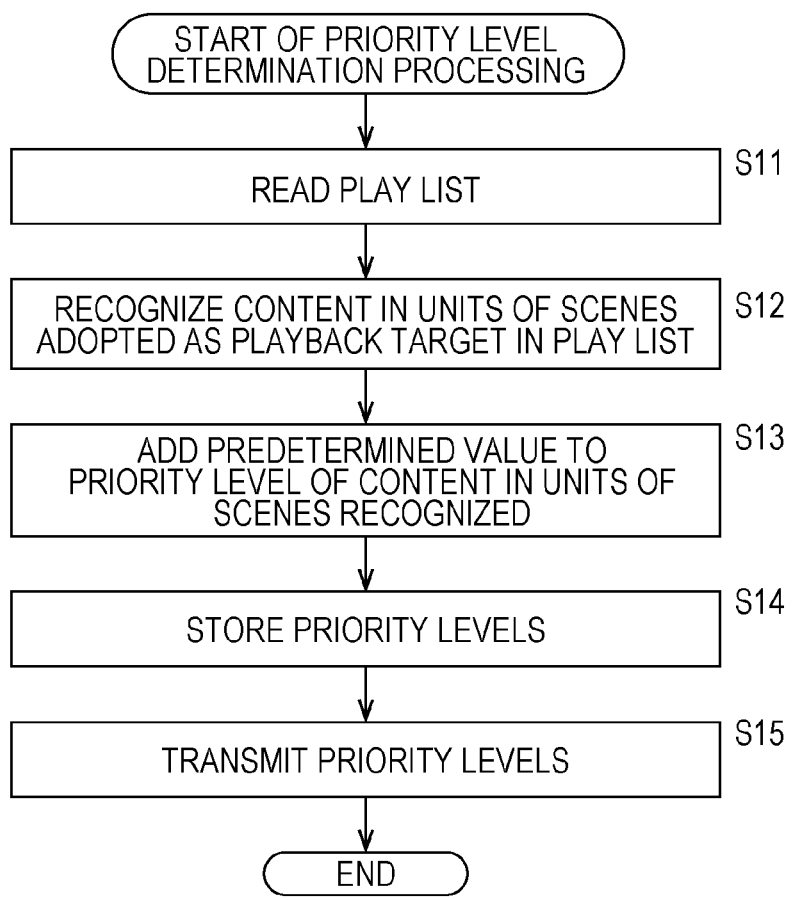
FIG. 4 is a flowchart for explaining priority level determination processing of a server of FIG. 1.

FIG. 4 is a flowchart for explaining priority level determination processing of the server 11 of FIG. 1. This priority level determination processing is started when, for example, a new play list is stored to the play list DB 36.

In step S11 of FIG. 4, the calculation unit 37 reads a new play list from the play list DB 36. In step S12, the calculation unit 37 recognizes content in units of scenes which are adopted as the playback target in the read play list.

In step S13, the calculation unit 37 adds a predetermined value to the priority level of content in units of scenes stored and recognized in step S12, and determines that the addition values obtained as a result are the priority levels of the content in units of scenes.

In step S14, the calculation unit 37 stores the priority levels of the content in units of scenes determined in step S13, and provides the priority levels of the content in units of scenes to the communication unit 39. In step S15, the communication unit 39 transmits the priority level of the content in units of scenes provided by the calculation unit 37 to the client 12, and terminates the processing.

The priority levels sent to the client 12 in the priority level determination processing are received by the communication unit 50, and stored to the cache control unit 52.

Figure 5:
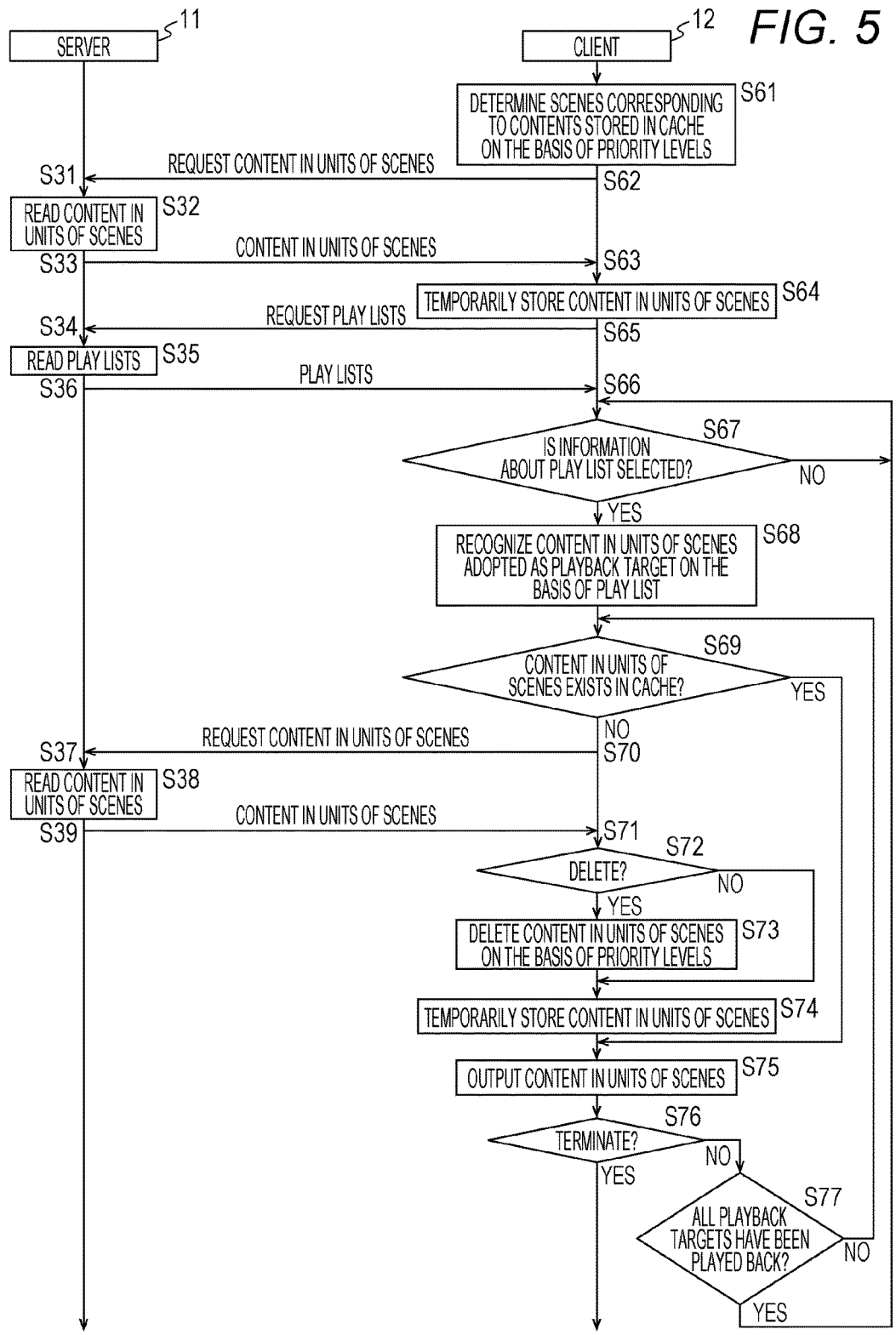
FIG. 5 is a flowchart for explaining playback processing of the information processing system of FIG. 1.

FIG. 5 is a flowchart for explaining playback processing of the information processing system 10 of FIG. 1. This playback processing is started when, for example, a command is given by a user to start playback processing.

In step S61, the cache control unit 52 determines scenes corresponding to contents to be stored in the cache 53 on the basis of the stored priority levels. More specifically, the cache control unit 52 determines scenes corresponding to content in units of scenes having sizes that can be stored in the cache 53 in the descending order of the stored priority levels. In step S62, the cache control unit 52 uses the communication unit 50 to request the server 11 to transmit content in units of scenes of the determined scene.

In step S31, the communication unit 39 receives the request for the content in units of scenes transmitted from the communication unit 50 of the client 12. In step S32, the communication unit 39 reads the content in units of scenes from the content DB 31 in response to the received request. In step S33, the communication unit 39 transmits the content in units of scenes to the client 12.

In step S63, the communication unit 50 receives the content in units of scenes transmitted from the communication unit 39, and provides the content in units of scenes to the cache control unit 52. In step S64, the cache control unit 52 temporarily stores the content in units of scenes provided by the communication unit 50 to the cache 53.

In step S65, the cache control unit 52 uses the communication unit 50 to request the server 11 to transmit the play lists.

In step S34, the communication unit 39 receives the request for the play lists transmitted from the communication unit 50. In step S35, the communication unit 39 reads all the play lists from the play list DB 36. In step S36, the communication unit 39 transmits the read play list to the client 12.

In step S66, the communication unit 50 receives the play lists transmitted from the communication unit 39, and provides the play lists to the cache control unit 52. The cache control unit 52 stores the play lists provided by the communication unit 50, and displays information about the play lists on the output unit 55.

In step S67, the cache control unit 52 determines whether information about a play list including contents of the playback target has been selected by the user from information about all the play lists displayed on the output unit 55.

When the information about the play list including contents of the playback target is determined not to have been selected in step S67, the cache control unit 52 waits until the information about the play list including contents of the playback target is selected.

On the other hand, when the information about the play list including contents of the playback target is determined to have been selected in step S67, the processing in step S68 is subsequently performed. In step S68, the cache control unit 52 recognizes the content in units of scenes adopted as the playback target on the basis of the play list corresponding to the information selected by the user, and sets the content in units of scenes at the first of the playback target as the current playback target.

In step S69, the cache control unit 52 determines whether the content in units of scenes of the current playback target is present in the cache 53 or not. When the content in units of scenes of the current playback target is determined not to be present in the cache 53 in step S69, the processing in step S70 is subsequently performed.

In step S70, the cache control unit 52 uses the communication unit 50 to transmit a request for the content in units of scenes of the current playback target.

In step S37, the communication unit 39 receives the request for the content in units of scenes transmitted from the communication unit 50. In step S38, the communication unit 39 reads the requested content in units of scenes from the content DB 31. In step S39, the communication unit 39 transmits the read content in units of scenes to the client 12.

In step S71, the communication unit 50 receives the content in units of scenes transmitted from the communication unit 39, and provides the content in units of scenes to the cache control unit 52. In step S72, the cache control unit 52 determines whether contents stored in the cache 53 are to be deleted or not.

More specifically, when the size of the free space of the cache 53 is smaller than the size of the content in units of scenes provided by the communication unit 50, the cache control unit 52 determines that contents stored in the cache 53 are to be deleted. On the other hand, when the size of the free space of the cache 53 is equal to or larger than the size of the content in units of scenes provided by the communication unit 50, the cache control unit 52 determines that contents stored in the cache 53 are not to be deleted.

When contents stored in the cache 53 are determined to be deleted in step S72, the cache control unit 52 deletes contents in units of scenes stored in the cache 53 on the basis of the stored priority levels in step S73.

More specifically, the cache control unit 52 deletes the contents in units of scenes stored in the cache 53 in the ascending order of the priority level, so that the size of the free space of the cache 53 becomes equal to or more than the size of the content in units of scenes provided by the communication unit 50. Then, the processing in step S74 is subsequently performed.

On the other hand, when contents stored in the cache 53 are determined not to be deleted in step S72, the processing in step S74 is subsequently performed. In step S74, the cache control unit 52 temporarily stores the content in units of scenes provided by the communication unit 50 to the cache 53, and proceeds to the processing in step S75.

When the content in units of scenes of the current playback target is determined to be present in the cache 53 in step S69, the processing in steps S70 to S74 are skipped, and the processing in step S75 is subsequently performed.

In step S75, the cache control unit 52 reads the content in units of scenes of the current playback target from the cache 53, and provides the content in units of scenes of the current playback target to the output unit 55 to cause the output unit 55 to output the content in units of scenes of the current playback target. At this occasion, the cache control unit 52 increases, by one, the number of times of viewing serving as a viewing history of the scene corresponding to the read content in units of scenes. The number of times of viewing is transmitted via the communication unit 50 to the server 11 to be stored in the viewing history DB 34.

In step S76, the cache control unit 52 determines whether the playback processing is to be terminated or not, more specifically, whether the user has given a command for terminating the playback processing or not.

When the playback processing is determined not to be terminated in step S76, the cache control unit 52 determines whether all the contents of the playback target indicated in the play list has been played back or not in step S77. When not all the contents of the playback target indicated in the play list are determined to have been played back in step S77, the cache control unit 52 newly adopts, as the contents of the current playback target, contents of the playback target subsequent to those of the current playback target. Then, the processing in step S68 is performed again, and the processing subsequent thereto is performed.

On the other hand, when all the contents of the playback target indicated in the play list are determined to have been played back in step S77, the cache control unit 52 increases, by one, the number of times of viewing of the play list. The number of times of viewing is transmitted via the communication unit 50 to the server 11 to be stored in the viewing history DB 34. The cache control unit 52 causes the output unit 55 to display information about the play lists stored again. Then, the processing in step S67 is performed again, and the processing subsequent thereto is performed. When the playback processing is determined to be terminated in step S76, the processing is terminated.

As described above, the server 11 calculates the priority levels about the cache 53 for each of the content in units of scenes on the basis of the play list, and the client 12 deletes, from the cache 53, contents of scenes with lower priority levels, on the basis of the calculated priority levels. Therefore, when the client 12 performs the playback using the play list, the contents of the scenes that are likely to be the playback target can be left in the cache 53. Consequently, the efficiency of temporal storage of contents to the cache 53 is high.

In addition, since the client 12 stores the content in units of scenes to the cache 53 on the basis of the priority levels before the playback, contents of scenes that are likely to be played back can be stored to the cache 53 even before the first playback. Therefore, contents can be quickly played back when they are played back for the first time.

In contrast, in the method for controlling the cache on the basis of the past usage such as usage frequency and viewing history, it is impossible to predict contents that are likely to be played back and store the contents to the cache before the first playback when there is no usage yet. Therefore, it is impossible to quickly playback contents when they are played back for the first time.

Second Embodiment

<Example of a Configuration of Second Embodiment of Information Processing System>

Figure 6:
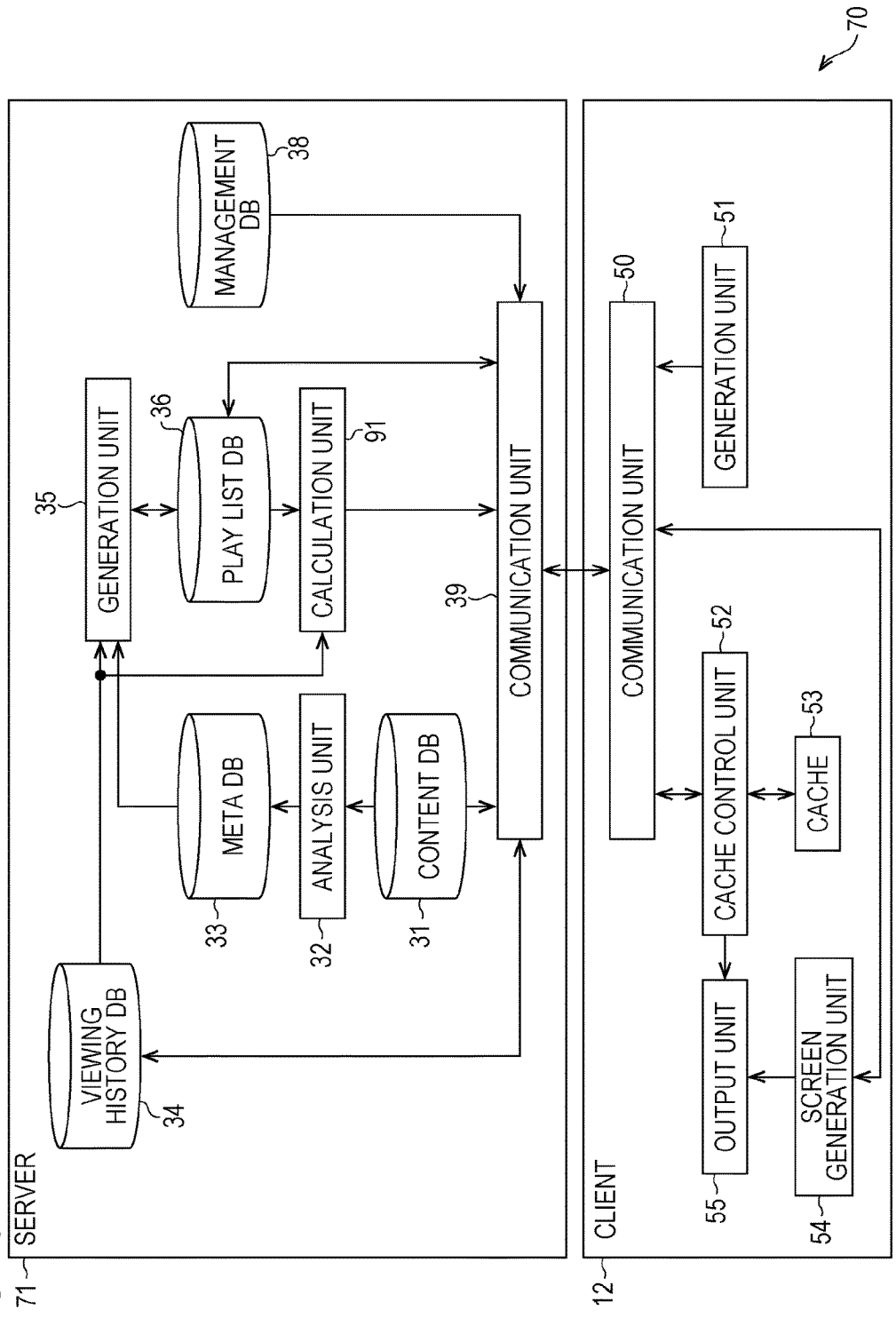
FIG. 6 is a block diagram illustrating an example of a configuration of a second embodiment of an information processing system to which the present technique is applied.

FIG. 6 is a block diagram illustrating an example of a configuration of the second embodiment of the information processing system to which the present technique is applied.

In the elements shown in FIG. 6, the same elements as those of FIG. 1 are denoted by the same reference signs. Repeated description thereabout is omitted as necessary.

An information processing system 70 of FIG. 6 includes a server 71 serving as an information processing apparatus and a client 12 serving as an information processing apparatus, and determines the priority level for each of contents in units of scenes on the basis of the viewing history of play lists and the play lists.

More specifically, the configuration of the server 71 is different from that of the server 11 of FIG. 1 in that a calculation unit 91 is provided instead of the calculation unit 37.

Like the calculation unit 37, the calculation unit 91 of the server 71 stores the priority levels of the contents in units of scenes. It should be noted that the initial value of the priority level is zero. The calculation unit 91 reads the viewing history of each play list from the viewing history DB 34, and determines the amount of addition of the priority level for each play list on the basis of the viewing history.

Then, calculation unit 91 reads all the play lists from the play list DB 36; and for each play list, the calculation unit 91 adds the amount of addition of the play list to the priority level of the content in units of scenes adopted as the playback target, thus updating the priority level.

More specifically, for example, when the number of times of viewing of the play list A, which serve as the viewing history of the play list A of FIG. 3, is eight times and the number of times of viewing of the play list B is two times, then the calculation unit 91 determines that the amount of addition for the priority level of the play list A is 8/10 and determines that the amount of addition for the priority level of the play list B is 2/10. Then, as the priority level of the content of the scene #1, the calculation unit 91 derives an addition value "1" which is obtained by adding the amount of addition 8/10 of the play list A and the amount of addition "2/10" of theplaylistB, inwhichthe content is indicated as the playback target, to the initial value "0".

As the priority level of the content of the scene #2, the calculation unit 91 derives an addition value "8/10" which is obtained by adding the amount of addition "8/10" for the priority level of the play list A, in which the content is indicated as the playback target, to the initial value "0". Further, as the priority level of the content of the scene #3, the calculation unit 91 derives an addition value "2/10" which is obtained by adding the amount of addition "2/10" for the priority level of the play list A, in which the content is indicated as the playback target, to the initial value zero.

It should be noted that the priority level may also be determined on the basis of information other than the number of times of viewing serving as the viewing history. For example, the calculation unit 91 may determine the amount of addition on the basis of the viewing date and time serving as the viewing history, so that a play list corresponding to contents viewed more recently is given a higher amount of addition. In this case, the priority levels of the contents in units of scenes viewed more recently are higher. The calculation unit 91 provides the updated priority levels to the communication unit 39.

<Description on Processing of Information Processing System>

Figure 7:
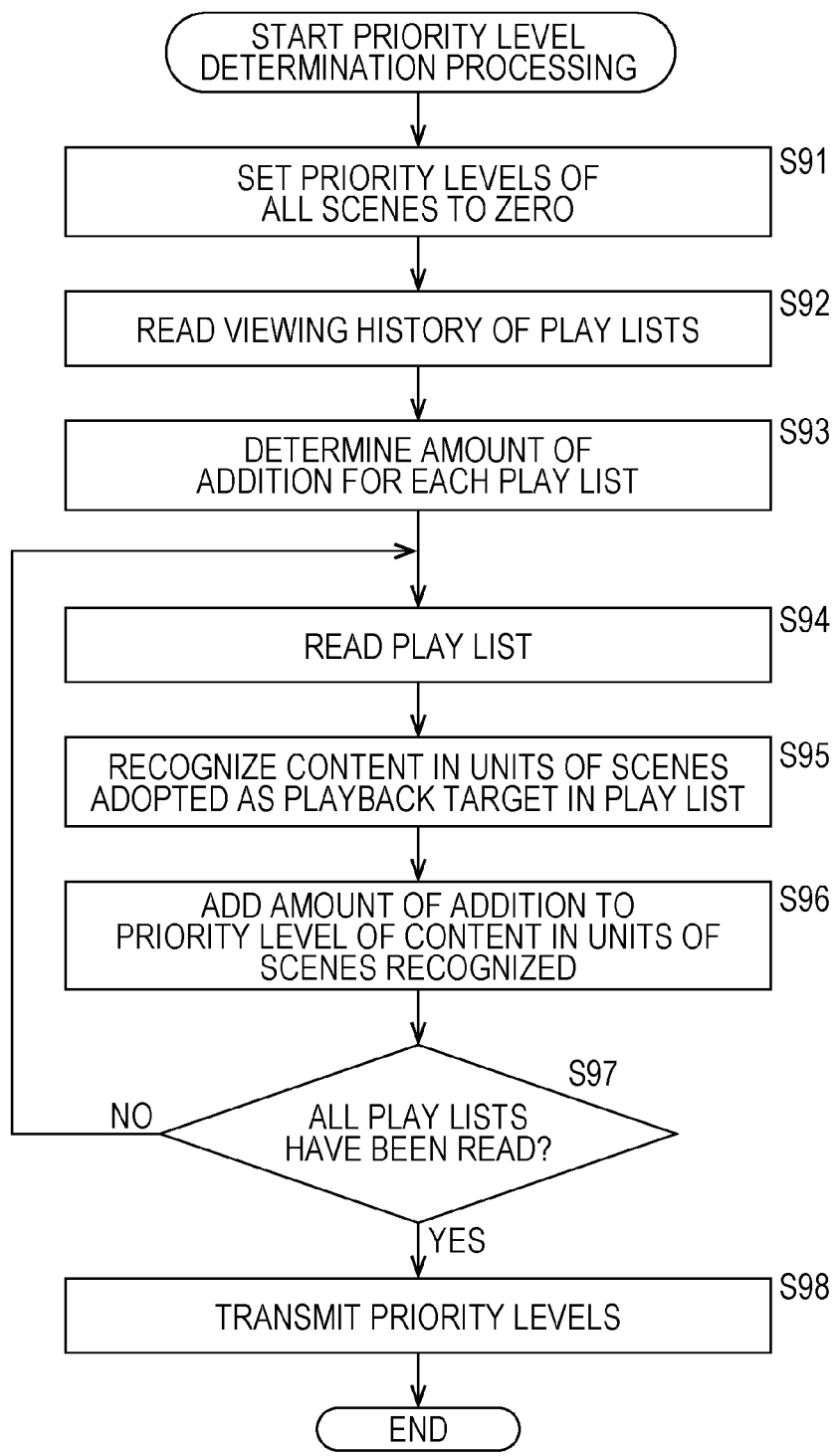
FIG. 7 is a flowchart for explaining priority level determination processing of a server of FIG. 6.

FIG. 7 is a flowchart for explaining priority level determination processing of the server 71 of FIG. 6. This priority level determination processing is started when, for example, the viewing history of the viewing history DB is updated.

In step S91 of FIG. 7, the calculation unit 91 of the server 71 sets the priority levels of all the scenes to zero which is the initial value, and stores them. In step S92, the calculation unit 91 reads the viewing history of each play list from the viewing history DB 34. In step S93, the calculation unit 91 determines the amount of addition of the priority level for each play list on the basis of the read viewing history.

In step S94, the calculation unit 91 reads a single play list, which has not yet been read, from the play list DB 36. In step S95, the calculation unit 91 recognizes the contents in units of scenes adopted as the playback target in the read play list.

In step S96, the calculation unit 91 adds the amount of addition of the play list read in step S94 to the priority levels of the contents in units of scenes stored and recognized in step S95, thus updating the priority levels.

In step S97, the calculation unit 91 determines whether all the play lists stored in the play list DB 36 have been read. When not all the play lists are determined to have been read in step S97, the processing in step S94 is performed again and the processing in steps S94 to S97 are repeated until all the play lists have been read.

On the other hand, when all the play lists are determined to have been read in step S97, the calculation unit 91 provides the updated priority levels to the communication unit 39. In step S98, the communication unit 39 transmits the priority levels provided by the calculation unit 91 to the client 12, and terminates the processing.

The playback processing of the information processing system 70 of FIG. 6 is the same as the playback processing of FIG. 5, and therefore, illustration and description thereof are omitted.

As described above, the server 71 calculates the priority level about the cache 53 for each of the content in units of scenes, on the basis of not only the play lists but also the viewing history of the play lists. Therefore, the priority levels of the contents in units of scenes that are more likely to be the playback target can be increased with a higher degree of accuracy. As a result, the temporary storage of the contents to the cache 53 can be further improved.

In the second embodiment, the priority level determination processing of FIG. 4 may be performed until the viewing history of the play list is stored to the viewing history DB 34, i.e., the first playback processing is finished. In this case, the priority level in the first playback processing is not the initial value as it is, and like the first embodiment, contents can be quickly played back when they are played back for the first time.

In the first and second embodiments, the cache 53 may store nothing until a user selects a play list including contents adopted as the playback target.

Third Embodiment

<Description on Computer to which the Present Technique is Applied>

The series of processing of the information processing system 10 explained above may be executed by hardware, or may be executed by software. When the series of processing is executed by software, programs included in the software are installed to the computer. In this case, the computer includes a computer incorporated into dedicated hardware and, for example, a general-purpose personal computer capable of executing various kinds of functions by installing various kinds of programs.

Figure 8:
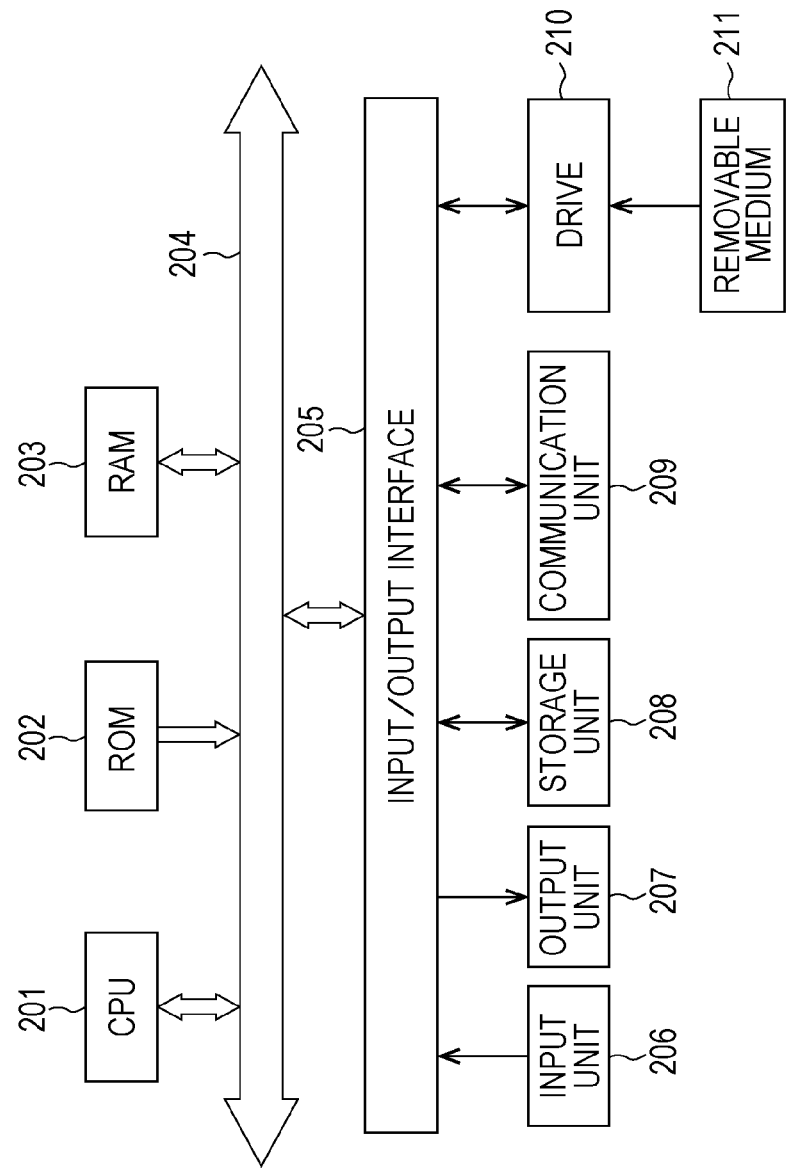
FIG. 8 is a block diagram illustrating an example of a configuration of hardware of a computer.

FIG. 8 is a block diagram illustrating an example of a configuration of hardware of a computer executing the above series of processing of the server 11 (71) described above by using programs.

In a computer, a CPU (Central Processing Unit) 201, a ROM (Read Only Memory) 202, and a RAM (Random Access Memory) 203 are connected to each other via a bus 204.

The bus 204 is further connected to an input/output interface 205. The input/output interface 205 is connected to an input unit 206, an output unit 207, a storage unit 208, a communication unit 209, and a drive 210.

The input unit 206 includes a keyboard, a mouse, a microphone, and the like. The output unit 207 includes a display, a speaker, and the like. The storage unit 208 includes a hard disk, a nonvolatile memory, and the like; and the storage unit 208 is included in, for example, the content DB 31, the meta DB 33, the viewing history DB 34, the play list DB 36, and the management DB 38.

The communication unit 209 includes a network interface and the like. The drive 210 drives a removable medium 211 such as a magnetic disk, an optical disk, a magneto-optical disk, and a semiconductor memory.

In the computer configured as described above, the CPU 201 performs the above series of processing by, e.g., executing the program stored in the storage unit 208 by loading the program to the RAM 203 via the input/output interface 205 and the bus 204.

The program executed by the computer (CPU 201) may be provided as being recorded to the removable medium 211 serving as, for example, a package medium. Further, the program can be provided via wired or wireless transmission media such as local area network, the Internet, and digital satellite broadcasting.

In the computer, the program can be installed to the storage unit 208 via the input/output interface 205 by loading the removable medium 211 to the drive 210. Further, the program can be installed to the storage unit 208 by receiving the program with the communication unit 209 via wired or wireless transmission media. Also, the program can be installed to the ROM 202 and the storage unit 208 beforehand.

It should be noted that the program executed by the computer may be those which perform processing in time sequence according to the order explained herein, or may those which perform processing in parallel or with necessary timing, e.g., upon calls.

The configuration of the hardware of the computer executing the above series of processing of the client 12 described above by using programs is the same as the configuration of FIG. 8, except that the cache 53 is connected to the bus; and therefore, description thereof is omitted.

The system, herein, means a set of multiple constituent elements (devices, modules (components), and the like), and it does not matter whether all the constituent elements are provided in the same housing or not. Therefore, both of multiple devices accommodated in separate housings and connected via a network and a single device including multiple modules accommodated in the single housing are systems.

The embodiments of the present technique are not limited to the above embodiments. The embodiments of the present technique can be changed in various manners without deviating from the gist of the present technique.

For example, the present technique may be configured as a cloud computing in which a single function is processed in such a manner that it is distributed in a cooperating manner by multiple apparatuses via a network.

Each step explained in the above flowchart may be executed by a single apparatus, or may be executed by multiple apparatuses in a distributed manner.

Further, in a case where multiple pieces of processing are included in a single step, the multiple pieces of processing included in the step may be executed by a single apparatus, or may be executed by multiple apparatuses in a distributed manner.

It should be noted that the present technique can be configured as follows.

(1)
An information processing apparatus including:
a calculation unit configured to calculate, on the basis of a play list indicating contents adopted as a playback target chosen from among a plurality of contents, a priority level about a storage unit temporarily storing the contents, for each of the contents.

(2)
The information processing apparatus according to (1), wherein the calculation unit adds a predetermined value to the priority level of the content adopted as the playback target in the play list, thus calculating the priority level.

(3)
The information processing apparatus according to (2), wherein the calculation unit determines the predetermined value for each of the play lists on the basis of a viewing history of the play list, and adds the predetermined value of the play list to the priority level of the content adopted as the playback target in the play list, thus calculating the priority level.

(4)
The information processing apparatus according to any of (1) to (3), wherein the contents are contents in units of scenes.

(5)
An information processing method including:
a calculation step in which an information processing apparatus calculates, on the basis of a play list indicating contents adopted as a playback target chosen from among a plurality of contents, a priority level about a storage unit temporarily storing the contents, for each of the contents.

(6)
A program for causing a computer to function as a calculation unit configured to calculate, on the basis of a play list indicating contents adopted as a playback target chosen from among a plurality of contents, a priority level about a storage unit temporarily storing the contents, for each of the contents.

(7)
An information processing system including:
a first information processing apparatus; and
a second information processing apparatus,
the information processing system further including:
a storage unit configured to temporarily store contents;
a calculation unit configured to calculate, on the basis of a play list indicating contents adopted as a playback target chosen from among a plurality of the contents, a priority level about the storage unit, for each of the contents; and
a control unit configured to delete the content stored in the storage unit, on the basis of the priority level calculated by the calculation unit.

(8)
The information processing system according to (7), wherein, on the basis of the priority level calculated by the calculation unit, the control unit determines the content that is to be stored to the storage unit before a play list of contents adopted as the playback target is selected, and stores the content to the storage unit.

REFERENCE SIGNS LIST

10 Information processing system
11 Server
12 Client
37 Calculation unit
52 Cache control unit
53 Cache
70 Information processing system
71 Server
91 Calculation unit

The invention claimed is:
1. An information processing apparatus, comprising:
one or more processors configured to:
acquire a first play list that comprises a set of content from a plurality of contents;
divide each content of the plurality of contents into a plurality of scenes;

determine meta data for each scene of the plurality of scenes based on the first play list;
generate a second play list based on the meta data, wherein
the second play list comprises at least one scene of the plurality of scenes as a playback target, and
the at least one scene is associated with a user preference;
determine a priority level associated with a storage unit for each content of the set of content based on addition of a specific value of the first play list to a specific value of the second play list; and
control, based on the priority level, storage of the set of content in the storage unit prior to a playback of the set of content.

2. An information processing method, comprising:
in an information processing apparatus:
acquiring a first play list that comprises a set of content from a plurality of contents;
dividing each content of the plurality of contents into a plurality of scenes;
determining meta data for each scene of the plurality of scenes based on the first play list;
generating a second play list based on the meta data, wherein
the second play list comprises at least one scene of the plurality of scenes as a playback target, and
the at least one scene is associated with a user preference;
determining a priority level associated with a storage unit for each content of the set of content based on addition of a specific value of the first play list to a specific value of the second play list; and
controlling, based on the priority level, storage of the set of content in the storage unit prior to a playback of the set of content.

3. A non-transitory computer-readable medium having stored thereon, computer-executable instructions, which when executed by a processor of an information processing apparatus, cause the information processing apparatus to execute operations, the operations comprising:
acquiring a first play list that comprises a set of content from a plurality of contents;
dividing each content of the plurality of contents into a plurality of scenes;
determining meta data for each scene of the plurality of scenes based on the first play list;
generating a second play list based on the meta data, wherein
the second play list comprises at least one scene of the plurality of scenes as a playback target, and
the at least one scene is associated with a user preference;
determining a priority level associated with a storage unit for each content of the set of content based on addition of a specific value of the first play list to a specific value of the second play list; and
controlling, based on the priority level, storage of the set of content in the storage unit prior to a play back of the set of content.

4. An information processing system, comprising:
one or more processors configured to:
acquire a first play list that comprises a set of content from a plurality of contents; and
a storage unit configured to store the set of content prior to a playback of the set of content,
wherein the one or more processors are further configured to:
divide each content of the plurality of contents into a plurality of scenes;
determine meta data for each scene of the plurality of scenes based on the first play list;
generate a second play list based on the meta data, wherein
the second play list comprises at least one scene of the plurality of scenes as a playback target, and
the at least one scene is associated with a user preference;
determine a priority level associated with the storage unit for each content of the set of content based on addition of a specific value of the first play list to a specific value of the second play list; and
delete the stored set of content from the storage unit, based on the priority level.

5. The information processing apparatus according to claim 1, further comprising an interface configured to receive information associated with selection of the set of content as the playback target.

6. The information processing apparatus according to claim 1, further comprising an output interface configured to output the set of content.

7. The information processing apparatus according to claim 1, wherein
the one or more processors are further configured to determine the specific value of the first play list based on a viewing history of the first play list, and
the viewing history is at least one of a number of times the first play list is viewed or viewing date of the first play list.

8. The information processing method according to claim 2, further comprising determining the specific value of the first play list based on a viewing history of the first play list, wherein the viewing history is at least one of a number of times the first play list is viewed or a viewing date and time of the first play list.

9. The non-transitory computer-readable medium according to claim 3, wherein
the operations further comprising determining the specific value of the first play list based on a viewing history of the first play list,
the viewing history is at least one of a number of times the first play list is viewed or a viewing date and time of the first play list.

10. The information processing system according to claim 4, wherein
the one or more processors are further configured to determine the specific value of the first play list based on a viewing history of the first play list,
the viewing history is at least one of a number of times the first play list is viewed or a viewing date and time of the first play list.

* * * * *